(12) United States Patent
Okamoto

(10) Patent No.: US 8,494,319 B2
(45) Date of Patent: Jul. 23, 2013

(54) ARRAYED WAVEGUIDE GRATING (AWG) WITH DIFFERENT RADII IN THE INPUT AND OUTPUT SLAB REGIONS

(75) Inventor: Katsunari Okamoto, Kanagawa (JP)

(73) Assignee: AiDi Corporation, Ibaraki (JP)

( * ) Notice: Subject to any disclaimer, the term of this patent is extended or adjusted under 35 U.S.C. 154(b) by 0 days.

(21) Appl. No.: 12/712,241

(22) Filed: Feb. 25, 2010

(65) Prior Publication Data

US 2010/0272394 A1 Oct. 28, 2010

Related U.S. Application Data

(60) Provisional application No. 61/155,569, filed on Feb. 26, 2009.

(51) Int. Cl.
*G02B 6/34* (2006.01)
*G02B 6/26* (2006.01)
*G02B 6/42* (2006.01)

(52) U.S. Cl.
USPC ............................................. 385/37; 385/46

(58) Field of Classification Search
USPC ......................................................... 385/37
See application file for complete search history.

(56) References Cited

U.S. PATENT DOCUMENTS

| | | | |
|---|---|---|---|
| 6,222,963 B1 | 4/2001 | Grand et al. | |
| 6,404,946 B1 | 6/2002 | Nakajima et al. | |
| 6,442,311 B1 | 8/2002 | Barbarossa et al. | |
| 6,456,763 B2 * | 9/2002 | Kashihara et al. | 385/37 |
| 6,490,395 B1 * | 12/2002 | Nara et al. | 385/39 |
| 6,563,986 B2 * | 5/2003 | Kashihara et al. | 385/37 |
| 6,668,117 B2 * | 12/2003 | Hasegawa et al. | 385/37 |
| 6,735,364 B2 * | 5/2004 | Kashihara et al. | 385/37 |
| 6,826,332 B2 * | 11/2004 | Saito et al. | 385/37 |
| 6,882,778 B2 * | 4/2005 | Fondeur et al. | 385/37 |
| 6,975,793 B2 | 12/2005 | Cole et al. | |
| 7,539,364 B2 * | 5/2009 | Cole et al. | 385/14 |
| 7,539,368 B2 * | 5/2009 | Hasegawa et al. | 385/14 |
| 2001/0006570 A1 * | 7/2001 | Kashihara et al. | 385/24 |
| 2002/0025116 A1 * | 2/2002 | Kashihara et al. | 385/37 |
| 2002/0034361 A1 * | 3/2002 | Kashihara et al. | 385/50 |
| 2003/0174949 A1 * | 9/2003 | Bhardwaj et al. | 385/37 |
| 2003/0194183 A1 * | 10/2003 | Fondeur et al. | 385/37 |
| 2004/0017971 A1 * | 1/2004 | Johannessen | 385/37 |
| 2004/0165811 A1 * | 8/2004 | Cole et al. | 385/14 |
| 2008/0135169 A1 * | 6/2008 | Rhee et al. | 156/256 |

OTHER PUBLICATIONS

Notification of Transmittal of the International Search Report and the Written Opinion of the International Searching Authority, International Search Report and Written Opinion, issued for PCT/US2010/025299, dated Oct. 26, 2010.

* cited by examiner

*Primary Examiner* — Rhonda Peace

(74) *Attorney, Agent, or Firm* — Jeff Klembczyk, Esq.; Kevin P. Radigan, Esq.; Heslin Rothenberg Farley & Mesiti P.C.

(57) ABSTRACT

Arrayed waveguide grating (AWG) circuits are disclosed, having different radii in the slab regions to supplement and/or replace other mechanical techniques which enable athermal AWGs. Dual band, interleaved pairs of athermal AWGs are also disclosed, with improved cost, space and center wavelength properties, for, e.g., optical line terminal (OLT), and remote node (RN) applications.

16 Claims, 10 Drawing Sheets

SCHEMATIC CONFIGURATION OF THERMAL AWGS INCORPORATING TWO PAIRS OF DUAL-BAND AWG IN ONE CHIP

C-BAND SIGNALS AND FILTER REFLECTANCE

L-BAND SIGNALS AND FILTER TRANSMITTANCE

DUAL-BAND ATHERMAL AWG FOR RN APPLICATION

ARRAYED WAVEGUIDE GRATING (AWG) WITH DIFFERENT RADII IN THE INPUT AND OUTPUT SLAB REGIONS

RELATED APPLICATION INFORMATION

This application claims the benefit of U.S. Provisional Patent Application 61/155,569, filed Feb. 26, 2009, entitled "Arrayed Waveguide Grating (AWG) With Different Radii in the Input and Output Slab Regions," which application is hereby incorporated by reference herein in its entirety.

TECHNICAL FIELD

The present invention relates to athermal (temperature insensitive) AWGs. More particularly, the present invention relates to a novel AWG configuration consisting of two slab regions with different radii.

BACKGROUND OF THE INVENTION

An AWG multiplexer should normally be stabilized/temperature controlled with a heater or a Peltier cooler to stabilize the channel wavelengths. This requires a constant electric power consumption of several watts and other equipment for temperature control. With reference to FIG. 1, a typical AWG 10 is shown having similarly-formed input 12 and output 14 slab waveguide regions. FIG. 1 also shows a technique for thermal stabilization involving a mechanical compensation approach. In this approach, the input waveguide is cut off at the interface between input node and the slab region 12. The separated input chip is attached to a metal rod 20, which is fixed to a stable post. The metal rod changes length with ambient temperature and shifts the input waveguide along the interface of the slab waveguide 12 to compensate for the thermal drift of the pass wavelength in AWG.

The present invention addresses the problem of tight alignment tolerances when the movable chip to which the metal rod is fixed is attached to the slab region of an AWG.

An effective wavelength in the array waveguide at T is given by $\lambda_0/n_c(T)$, where $n_c=\beta_c/k$ ($\beta_c$: propagation constant of the waveguide). When temperature is changed from T to $T+\Delta T$, the effective index $n_c$ becomes $n_c(T+\Delta T)=n_c(T)+\Delta T \cdot dn_c/dT$. Temperature dependence of $n_c$ in silica glass is $dn_c/dT=1.1\times10^{-5}$ (1/deg). The effective wavelength in the waveguide at $T+\Delta T$ is expressed by:

$$\frac{\lambda_0}{n_c(T+\Delta T)} = \frac{\lambda_0}{n_c(T) + \frac{dn_c}{dT}\cdot\Delta T} \cong \frac{\lambda_0 - \frac{\lambda_0}{n_c}\frac{dn_c}{dT}\cdot\Delta T}{n_c(T)}. \quad (1)$$

It is known from Eq. (1) that the effective-index variation by the temperature change $\Delta T$ is equivalent to the wavelength change $\Delta\lambda$ in an amount of:

$$\Delta\lambda = -\frac{\lambda_0}{n_c}\frac{dn_c}{dT}\cdot\Delta T. \quad (2)$$

Since the dispersion of the focal position x with respect to the wavelength change is given by K. Okamoto, *Fundamentals of Optical Waveguides*, 2nd Edition (Elsevier, N.Y., 2006) chapter 9, as:

$$\frac{\Delta x}{\Delta\lambda} = -\frac{N_c f \Delta L}{n_s d \lambda_0}, \quad (3)$$

a shift of the focal position x with respect to the temperature variation is obtained by:

$$\Delta x = \frac{N_c f \Delta L}{n_s d} \cdot \frac{dn_c}{dT} \cdot \frac{\Delta T}{n_c}. \quad (4)$$

On the other hand the thermal expansion of the compensating rod shifts the input waveguide by:

$$\Delta x_1 = -(\alpha_{rod} - \alpha_{chip})L\Delta T, \quad (5)$$

where L is the length of the compensating rod, and $\alpha_{rod}$ and $\alpha_{chip}$ are thermal expansion coefficients of the metal rod and AWG chip ($\alpha_{rod} > \alpha_{chip}$), respectively. When the input waveguide is shifted by $\Delta x_1$, the focal position at the output side moves by $\Delta x^* = \Delta x_1$. When $\Delta x^* = -\Delta x$ holds, shift of the focal position due to temperature change is canceled out. The athermal condition for the length of the metal rod L is obtained by using Eqs. (4) and (5) by:

$$(\alpha_{rod} - \alpha_{chip})L = \frac{N_c f \Delta L}{n_s d} \cdot \frac{1}{n_c} \frac{dn_c}{dT}. \quad (6)$$

The shift of the focal position is about $\Delta x = \pm 19.4$ μm for the temperature variation of $\Delta T = \pm 50°$ C. centered at 20° C. for a typical AWG with input/output waveguide spacing at the slab interface D=27 μm, array waveguide spacing at the slab-array interface d=15 μm, focal length of first and second slab f=19.854 mm, path length difference $\Delta L$=31.0 μm, channel spacing $\Delta\lambda$=0.8 nm (100 GHz), number of channels N=64, and operating wavelength $\lambda_0$=1.55 μm.

When attaching the movable chip to the original AWG chip, the alignment of the input waveguide to the proper position of the first slab region requires fine accuracy. Typical center wavelength accuracy for a 100-GHz AWG is ±0.032 nm (±5 GHz). This corresponds to a positional accuracy of ±1 μm since input/output waveguide spacing D=20 μm corresponds to the channel spacing of 0.8 nm (100 GHz). Because alignment accuracy of ±1 μm is very tight, any failure of the initial alignment and glue process easily leads to out-of-specification center wavelength (frequency). This is the major reason for lower yields and higher costs of mechanically athermalized AWGs.

The present invention achieves larger alignment tolerances, to thereby achieve higher yields and lower costs for athermal AWGs.

SUMMARY OF THE INVENTION

The shortcomings of the prior art are overcome and additional advantages are provided by the present invention, which in one aspect is an arrayed waveguide grating having a plurality of input signal waveguides running toward an input slab waveguide, the input slab waveguide characterized by an input slab waveguide radius between ends thereof; and a plurality of output signal waveguides running from an output slab waveguide, the output slab waveguide characterized by an output slab waveguide radius between ends thereof. The input slab waveguide radius is different than the output slab waveguide radius.

A mechanically actuated stabilizing apparatus may also be implemented with respect to the input or output signal waveguides for shifting the signal waveguides according to an ambient temperature.

The mechanically actuated stabilizing apparatus may include a separated chip area across which the input or output signals traverse toward the input or output slab waveguides, the chip area being moveable according to temperature to thereby shift the input or output signal waveguides relative to the input or output slab waveguide. The input or output slab waveguide which is closer to the separated chip has a larger radius and therefore a greater tolerance to movement of the separated chip.

Improved arrayed waveguide grating circuits are also disclosed, having a plurality of arrayed waveguide gratings as disclosed herein, in one example, including at least two pairs of interleaved arrayed waveguide gratings.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 2:
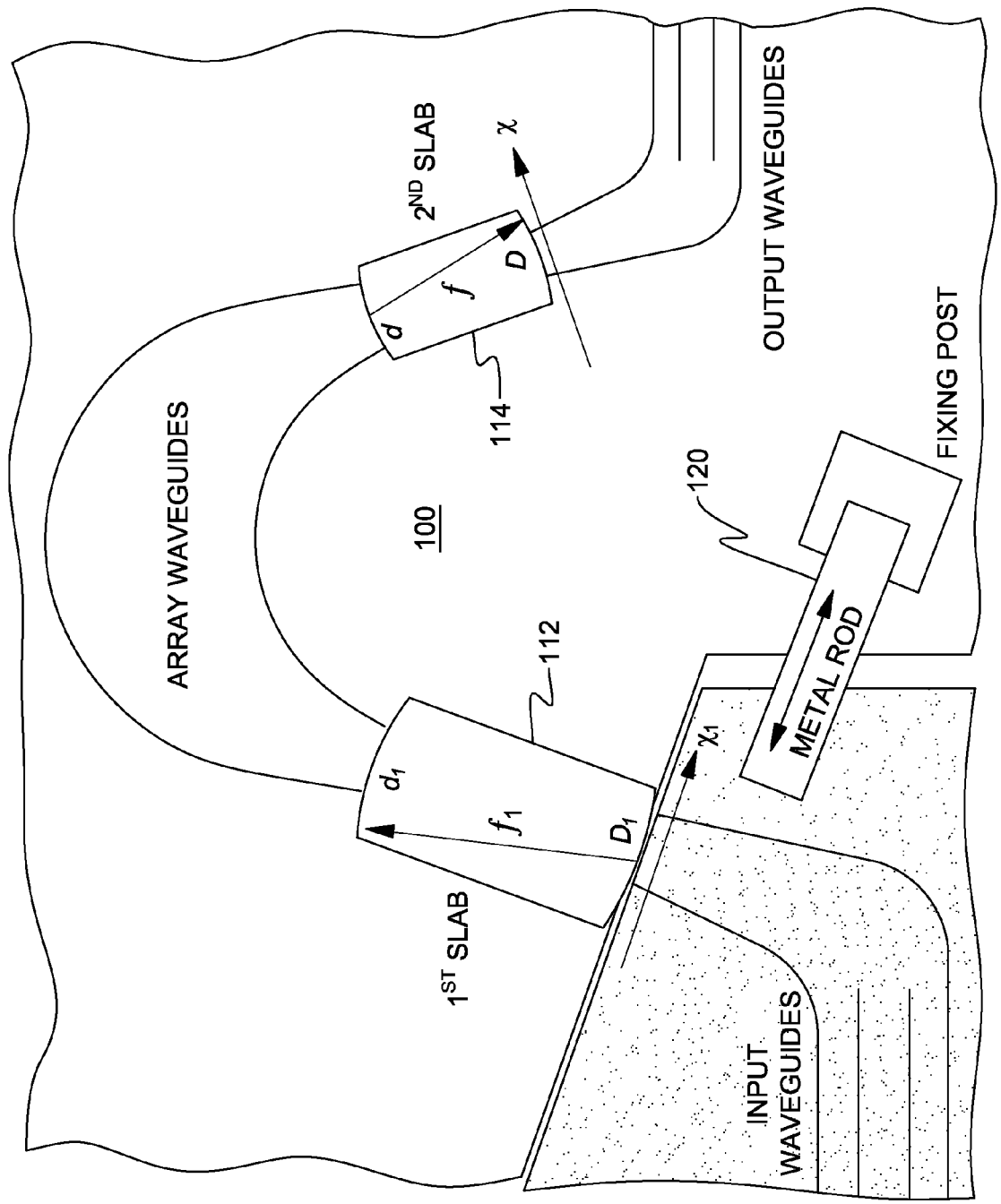
FIG. 2 is a schematic of an athermal AWG with different radii in the input and output slab regions (e.g., the radius of curvature $f_1$ in the first slab is larger than f in the second slab) in accordance with the present invention.
Figure 3:
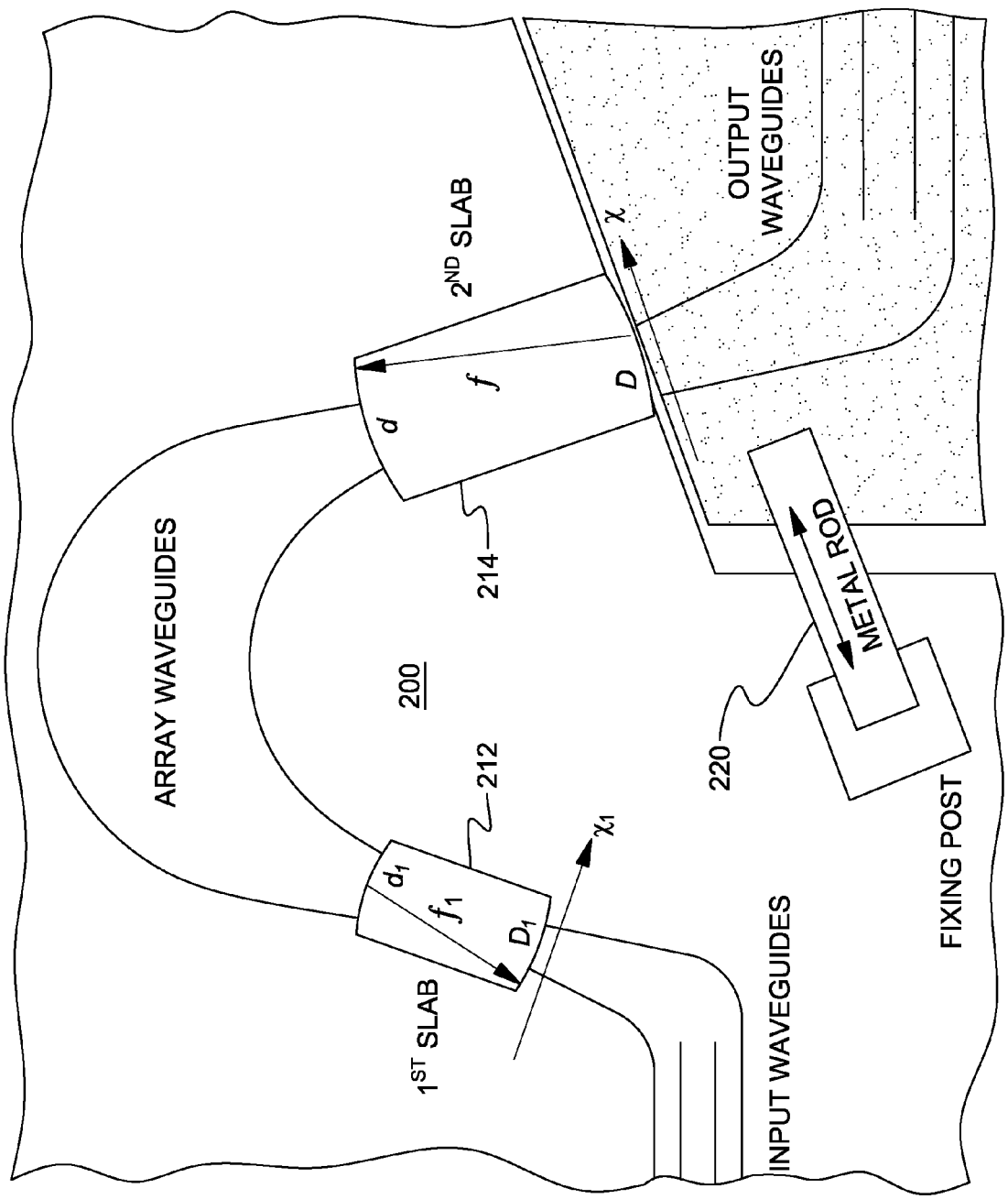
FIG. 3 is a schematic of an athermal AWG with different radii in the input and output slab regions (e.g., the radius of curvature f in the second slab is larger than $f_1$ in the first slab) in accordance with the present invention.

In accordance with the present invention, FIGS. 2 and 3 show schematic configurations of athermal AWGs with different radii in the input and output slab regions in accordance with the present invention. FIG. 2 shows a Type I athermal AWG 100 in which the radius of curvature $f_1$ in the first slab 112 is larger than f in the second slab 114. FIG. 3 shows a Type II athermal AWG 200 in which the radius of curvature $f_1$ in the first slab 212 is smaller than f in the second slab 214. This technique can be used in connection with the above-discussed mechanical compensation technique involving metal rods 120, 220 respectively.

In one embodiment of the Type I athermal AWG 100 in accordance with the present invention, exemplary parameters include radius of curvature of the first slab $f_1$=29.414 mm, input waveguide spacing $D_1$=40 μm, radius of curvature of the second slab f=19.854 mm, and the output waveguide spacing D=27 μm. Other exemplary parameters may be the same as those in the conventional AWG (FIG. 1); they are, path length difference $\Delta L$=31.0 μm, channel spacing $\Delta\lambda$=0.8 nm (100 GHz), number of channels N=64, and operating wavelength $\lambda_0$=1.55 μm. $f_1$ and $D_1$ should be about 50% larger than f and D in one embodiment.

Shift of the focal position x with respect to the temperature variation is obtained by:

$$\Delta x = \frac{N_c f \Delta L}{n_s d} \cdot \frac{d n_c}{dT} \cdot \frac{\Delta T}{n_c}. \quad (7)$$

Contrasted with a conventional AWG (FIG. 1), the focal position at the output moves by $\Delta x^* = (f/f_1) \cdot \Delta x_1$ when the input waveguide is shifted by $\Delta x_1$. When $\Delta x^* = -\Delta x$ holds, shift of the focal position due to temperature change is canceled out. Then the athermal condition for the type I AWG is expressed by using Eqs. (5) and (7) as:

$$\Delta x^* = \frac{f}{f_1} \cdot \Delta x_1 \quad (8)$$

$$= -\frac{f}{f_1} \cdot (\alpha_{rod} - \alpha_{chip}) \hat{L} \Delta T$$

$$= -\frac{N_c f \Delta L}{n_s d} \cdot \frac{d n_c}{dT} \cdot \frac{\Delta T}{n_c},$$

where $\hat{L}$ is the length of the compensating rod in the Type I athermal AWG. The above equation reduces to:

$$(\alpha_{rod} - \alpha_{chip}) \frac{f}{f_1} \cdot \hat{L} = \frac{N_c f \Delta L}{n_s d} \cdot \frac{1}{n_c} \cdot \frac{d n_c}{dT}. \quad (9)$$

By the comparison of Eqs. (6) and (9), it is known that $\hat{L}$ is related with L by:

$$\hat{L} = \frac{f_1}{f} L. \quad (10)$$

Figure 1:
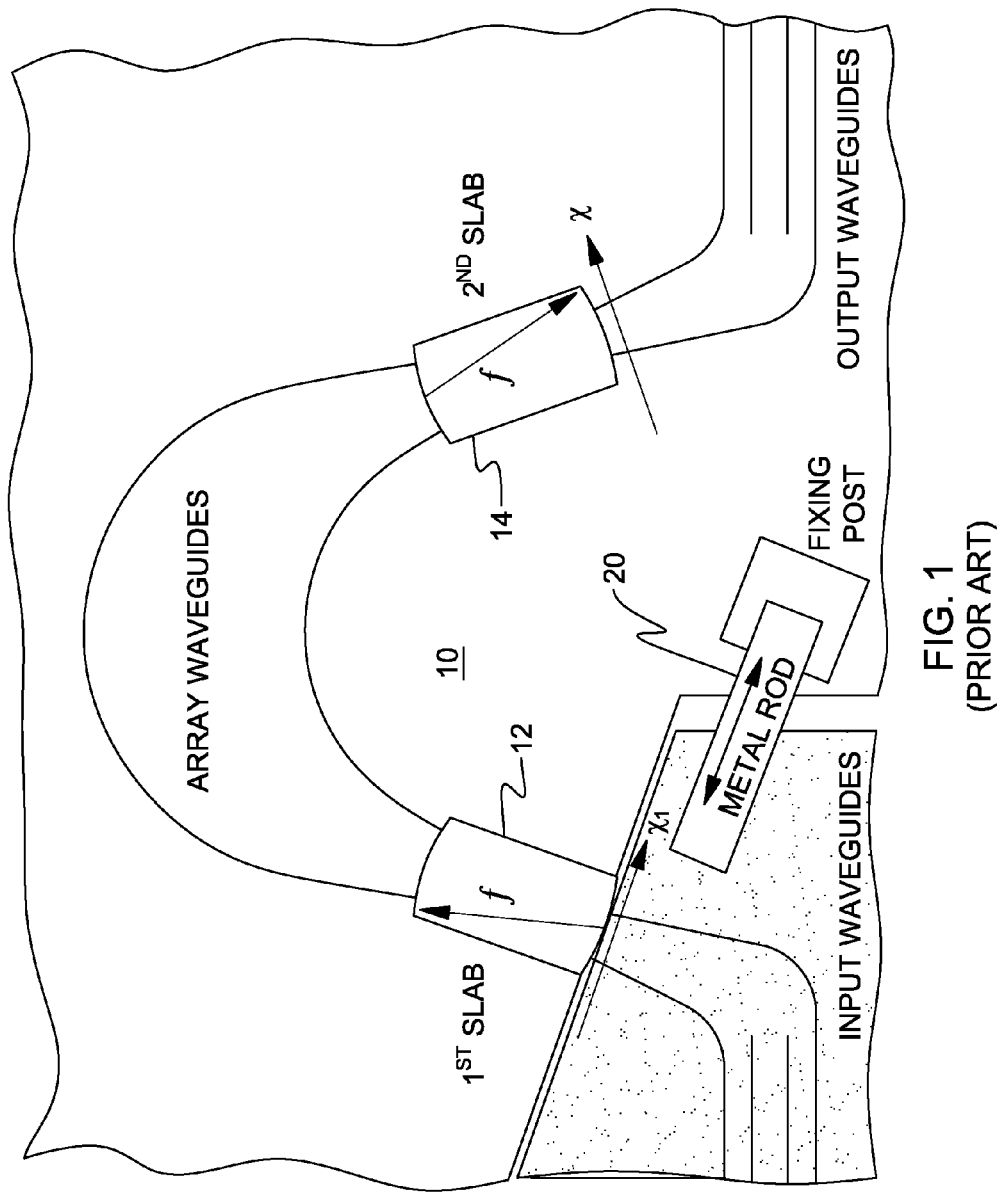
FIG. 1 is a schematic of a conventional, mechanically athermalized AWG.

Eq. (10) indicates that the input waveguide should move $f_1/f$ (≈1.5 in FIG. 2) times more than the conventional athermal AWG (FIG. 1). In other words, the alignment accuracy becomes ±1.5 μm, which is 50% larger than conventional athermal AWG technologies. A 50% larger alignment tolerance allows higher yields and lower costs to be achieved for athermal AWGs.

In one embodiment of a Type II athermal AWG 200 (FIG. 3) in accordance with the present invention, exemplary parameters include radius of curvature of the second slab f=29.414 mm, the output waveguide spacing D=40 μm, radius of curvature of the first slab $f_1$=19.854 mm, and the input waveguide spacing $D_1=27$ μm. Other exemplary parameters may be the same as those in a conventional AWG (FIG. 1); they are, path length difference $\Delta L=31.0$ μm, channel spacing $\Delta\lambda=0.8$ nm (100 GHz), number of channels N=64, and operating wavelength $\lambda_0=1.55$ μm. f and D should be about 50% larger than $f_1$ and $D_1$ in one embodiment.

The shift of the focal position x with respect to the temperature variation is given $$\Delta x = \frac{N_c f \Delta L}{n_s d} \cdot \frac{d n_c}{dT} \cdot \frac{\Delta T}{n_c}. \quad (11)$$

Note here f=29.414 mm, which is about 50% larger than f in Eq. (4). In the type II AWG, output waveguides should move so as to cancel the focal position movement due to the ambient temperature change. Shift of the output waveguides for the temperature change $\Delta T$ is expressed as:

$$\Delta x = (\alpha_{rod} - \alpha_{chip})\hat{L}\Delta T. \quad (12)$$

where $\hat{L}$ is the length of the compensating rod in type II athermal AWG. The athermal condition for the type II AWG is obtained by from Eqs. (11) and (12) by:

$$(\alpha_{rod} - \alpha_{chip})\hat{L} = \frac{N_c f \Delta L}{n_s d} \cdot \frac{1}{n_c} \cdot \frac{d n_c}{dT}. \quad (13)$$

Since f(=29.414 mm) is about 50% larger than that in the conventional athermal AWG, the input waveguide should move 1.5 times more than the conventional AWG. In other words, the alignment accuracy becomes ±1.5 μm, which is 50% larger than the conventional athermal AWG technology. A 50% larger alignment tolerance allows higher yields and lower costs for athermal AWGs.

In FIGS. 2 and 3, the radius of curvature f of the first slab is about 50% larger than f of the second slab for the Type I athermal AWG, and the radius of curvature f of the second slab is 50% larger than $f_1$ of the first slab for the Type II athermal AWG, respectively. Therefore, the alignment tolerance of ±1.5 μm, which is 50% larger than the conventional athermal AWG, has been obtained.

An alignment tolerance of ±2.0 μm, which is two times larger than the conventional athermal AWG, can be obtained when the radius of curvature $f_1$ of the first slab is two times larger than that f of the second slab in Type I athermal AWG, and the radius of curvature f of the second slab is two times larger than that $f_1$ of the first slab in Type II athermal AWG, respectively.

In general, but without limitation, the difference in slab radii should be at least about 30% in accordance with the present invention.

Figure 4:
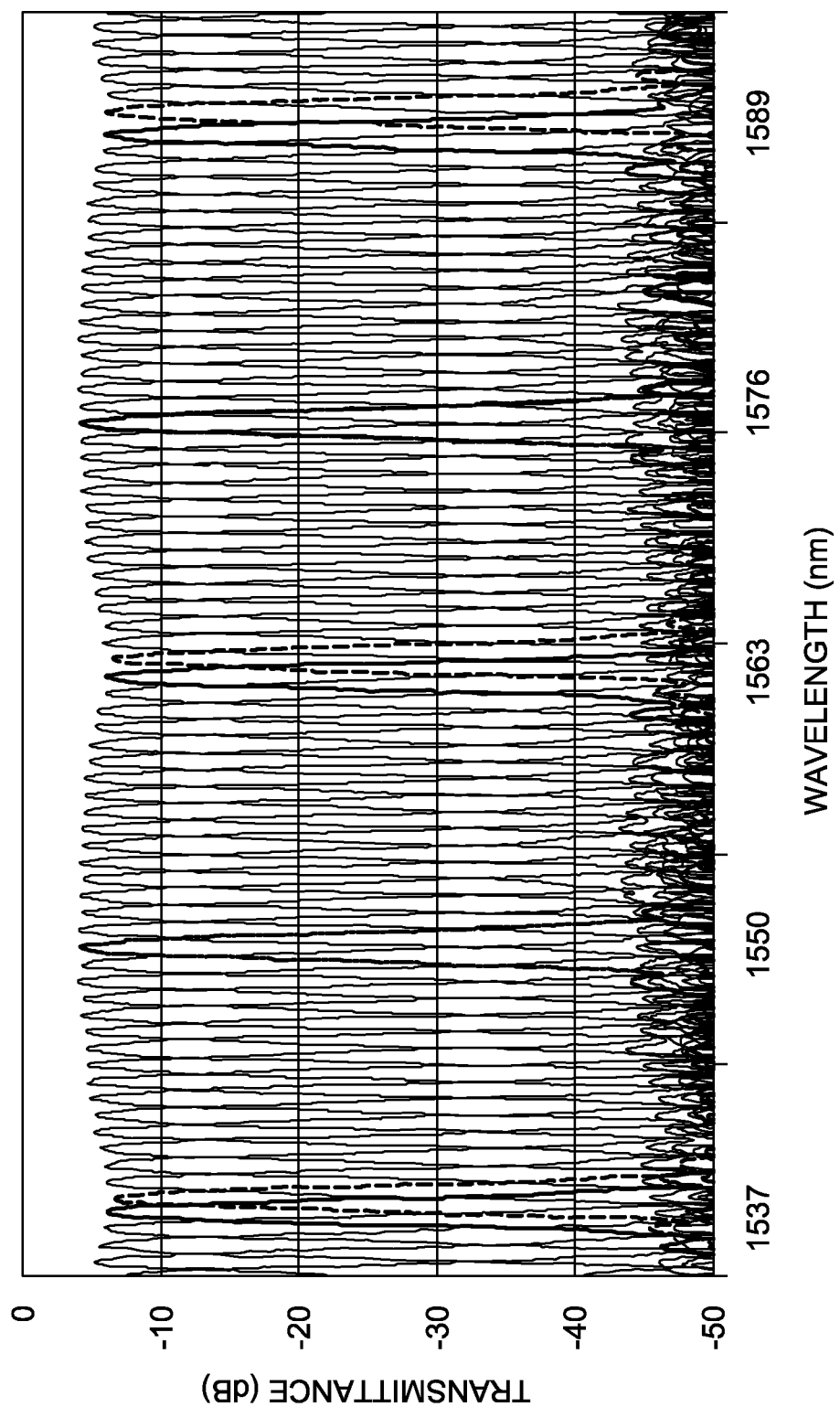
FIG. 4 is a graph of the cyclic property of an AWG having channel spacing $\Delta\lambda$=0.8 nm (100 GHz) and channel number $N_{ch}$=32.

The present invention also addresses the problem of wavelength misalignment in a dual-band AWG filter from ITU-T (International Telecommunication Union Telecommunication Standardization Sector) grid specifications. This problem is difficult to address, due to the operational principle of AWGs. Normally, the cyclic property of an AWG is utilized to achieve dual-band operation in WDM-PON systems (see for example, S. J. Park, et al., "Fiber-to-the-Home services based on Wavelength-Division-Multiplexing Passive Optical Network", IEEE Jour. of Lightwave Tech., vol. 22, no. 11, pp. 2582-2591, November 2004). A typical cyclic property of an AWG is shown in FIG. 4. Channel spacing $\Delta\lambda$ and channel number $N_{ch}$ of the AWG are $\Delta\lambda=0.8$ nm (100 GHz) and $N_{ch}=32$. The separate line types in FIG. 4 indicate the demultiplexing properties at the output ports no. 1, no. 16 and no. 32.

Signals with different wavelengths can be demultiplexed at each output port of an AWG. Signals with different wavelengths are each designated with a unique number m, which is called as "diffraction order" of the AWG. Diffraction order m is related to the central passband wavelength $\lambda_c$ (output port $N_{ch}/2$) of an AWG (K. Okamoto, *Fundamentals of Optical Waveguides*, 2nd Edition, Elsevier, N.Y., 2006, chapter 9), according to:

$$\lambda_c = \frac{n_c \Delta L}{m}, \quad (14)$$

where $n_c$ and $\Delta L$ denote effective index of the core and geometrical path length difference in the array waveguide, respectively. $n_c$ and $\Delta L$ are fixed values when the AWG configuration is determined. For the AWG shown in FIG. 4, $n_c=1.45476$ and $\Delta L=62.87$ μm. Based on Eq. (14), the central passband wavelength for m=59 is $\lambda_{c,m}=1550.116$ nm (193.4 THz) (C-band) and the wavelength for m=58 is $\lambda_{c,m}=1576.842$ nm (190.122 THz) (L-band) and etc.

WDM-PON systems proposed by Novera Optics (now LG-Nortel) employ a single AWG to support C-band downstream signals and L-band upstream signals simultaneously. This can be quite advantageous for cost and space savings in OLT (optical line terminal) and RN (remote node) equipment.

However, when the cyclic property is used for dual-band AWGs, center wavelengths in C- and L-band cannot be adjusted to the ITU-T specifications simultaneously. In the above-mentioned example, the center wavelength in C-band is $\lambda_{c,m=59}=1550.116$ nm (193.4 THz) which is exactly adjusted to the ITU-T specification. But, the center wavelength in L-band is $\lambda_{c,m=58}=1576.842$ nm (190.122 THz) which is 0.022 THz (=22 GHz) off the ITU-T specification. This simply results from the theoretical property of AWGs (Eq. 4). Moreover, channel spacing in L-band is about 104 GHz due to the refractive-index dispersion of silica glass. Therefore, entire wavelengths in the L-band deviate from the ITU-T wavelength.

Figure 5:
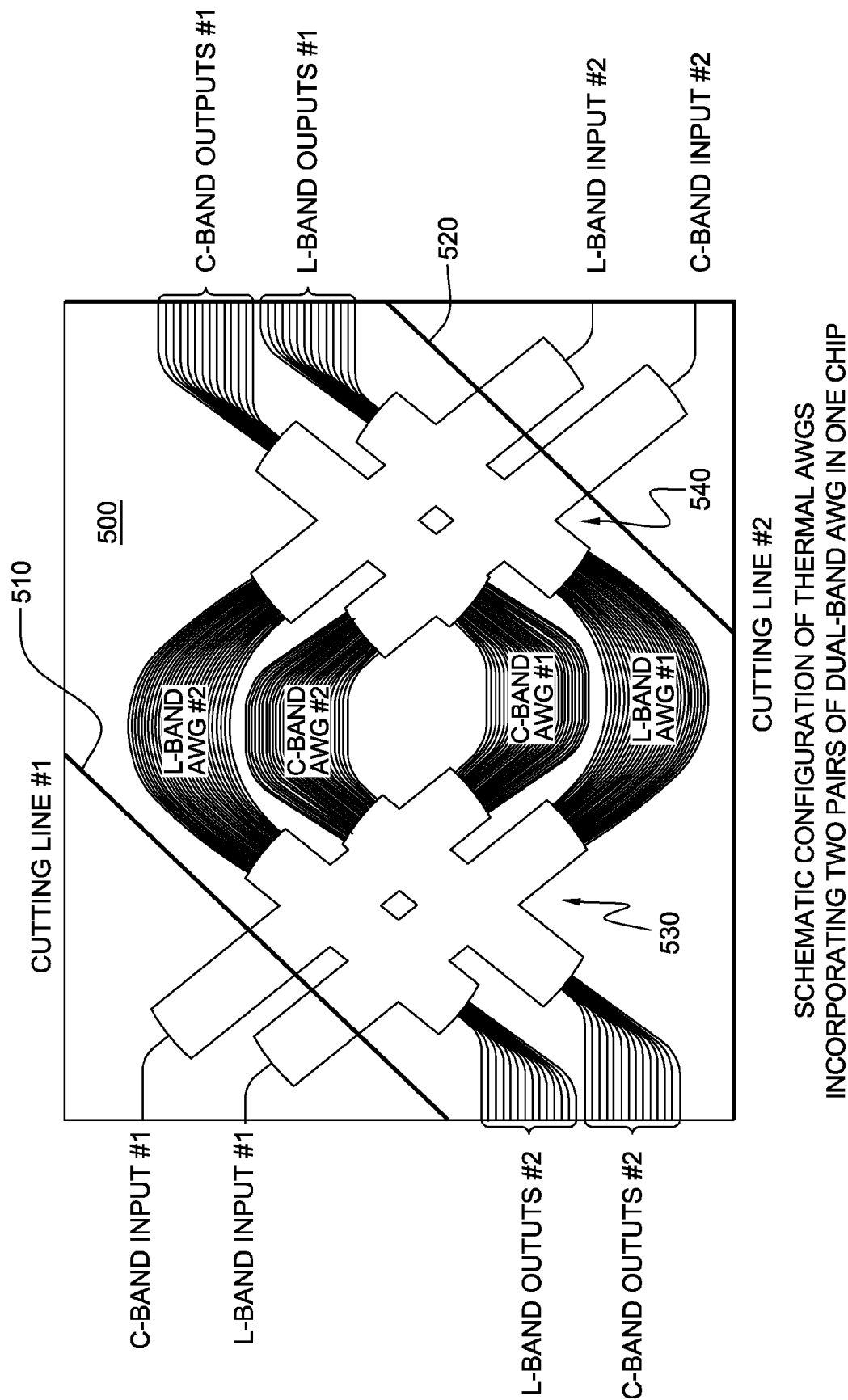
FIG. 5 is a schematic of a circuit incorporating two pairs of athermal, dual-band AWGs in one chip, in accordance with the present invention.

In one aspect of the present invention, a dual-band AWG is provided having center wavelengths in both C- and L-bands which are all adjusted to the ITU-T specifications. As an example, FIG. 5 shows a schematic of an athermal AWG circuit 500 incorporating two pairs of dual-band AWGs in one chip. The AWGs are interleaved, with the input and output slab regions sharing the same core layer in areas 530, 540; and may also have the elements of the mechanical athermal approach (cutting lines 510, 520 shown through the slab waveguides as an example placement only); and different radii for the input and output slab waveguides, as discussed above.

Channel spacing $\Delta\lambda$ and channel number $N_{ch}$ of the AWG are $\Delta\lambda=0.8$ nm (100 GHz) and $N_{ch}=64$ for C- and L-band. Path length difference and diffraction order for the C-band AWG are $\Delta L=30.81$ μm and m=29 and those for the L-band AWG are $\Delta L=30.66$ μm and m=28, respectively. Center wavelengths in both C- and L-band are all adjusted to the ITU-T specifications, based on independently optimizing the $\Delta L$ and m pair of specifications. 40 channels among 64 channels are utilized for metro applications and 32 among 64 are used in WDM-PON systems. As shown, the slab regions of the two dual-band AWG pairs can cross in the same layer because there is no detrimental effect for the wavelengths crossing each other. Therefore, the chip size of the current dual-band AWG becomes almost the same as that of the cyclic AWG. Therefore, the dual-band AWG of the current invention retains the advantages of cost and space savings for OLT and RN equipment.

Figure 6:
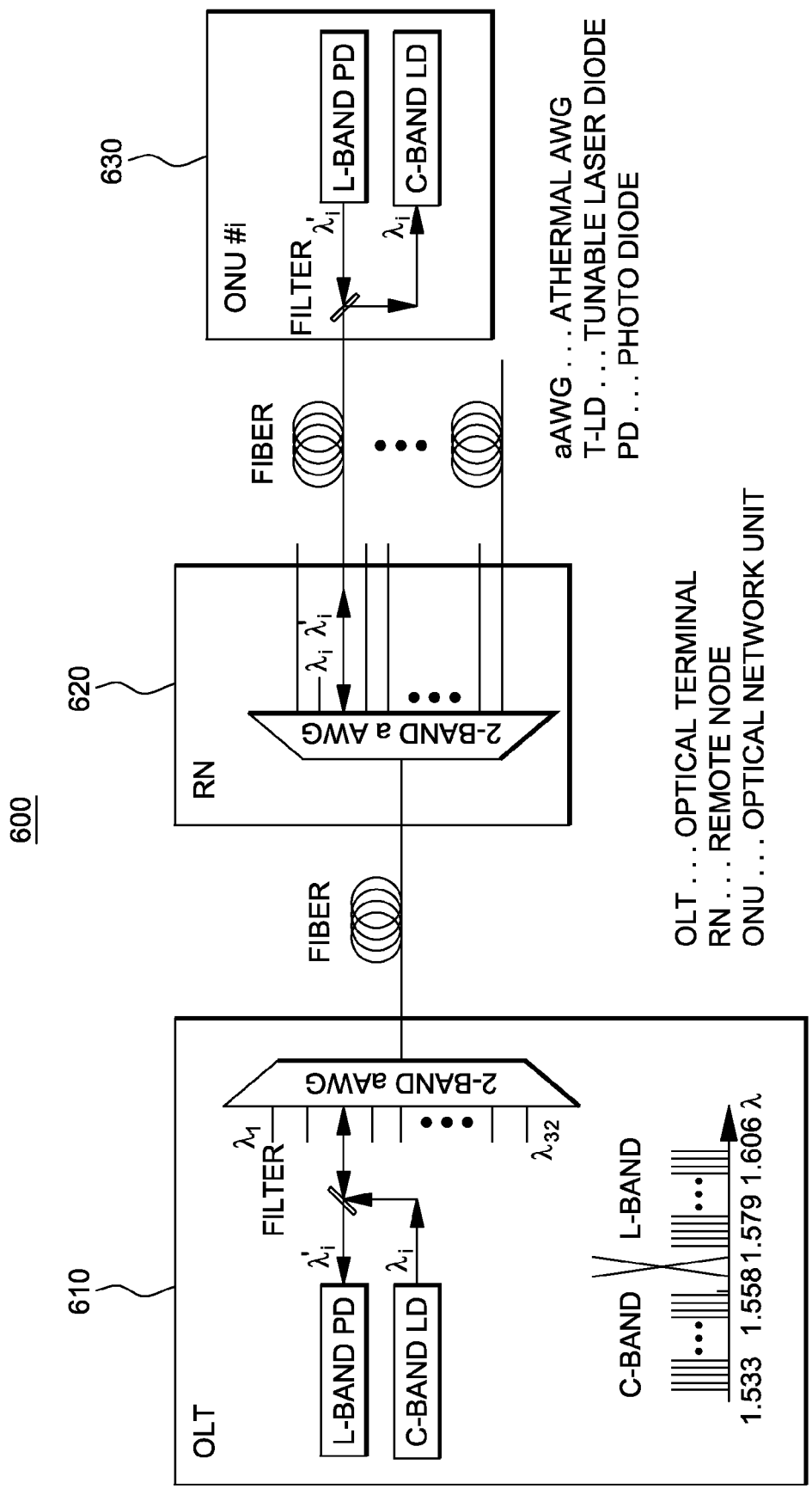
FIG. 6 is a schematic of a WDM-PON architecture using dual-band athermal AWGs, in accordance with the present invention.

An exemplary WDM-PON architecture 600 using dual-band athermal AWGs is shown in FIG. 6. In the optical line terminal 610, 32 C-band wavelength tunable LDs (downstream) and 32 L-band (upstream) PDs are multi/demultiplexed by a dual-band athermal AWG. At the remote node 620, downstream C-band signals are demultiplexed by another dual-band athermal AWG and distributed into each subscriber ONU 630. Downstream signal $\lambda_i$ at the ONU #i (i=1~32) is detected by the PD. Upstream signal $\lambda_i'$ from the L-band T-LD is multiplexed by the dual-band athermal AWG at RN and sent to the OLT. Coarse multi/demultiplexing of the C- and L-band signals are carried out by using thin film interference filters.

Figure 7A:
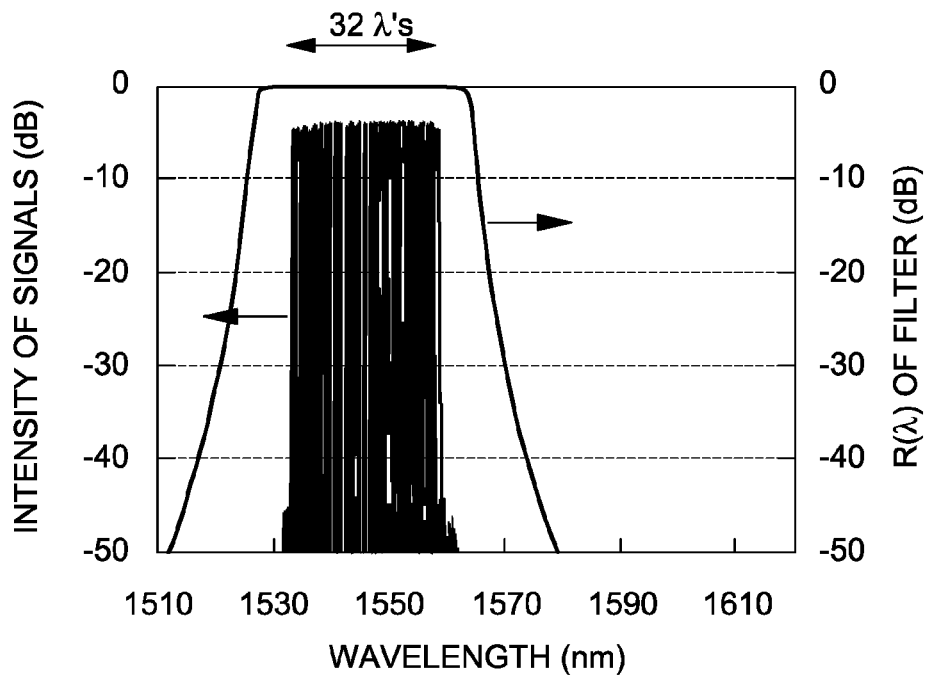
FIG. 7 depicts band filtering characteristics of the interference filter.
Figure 7B:
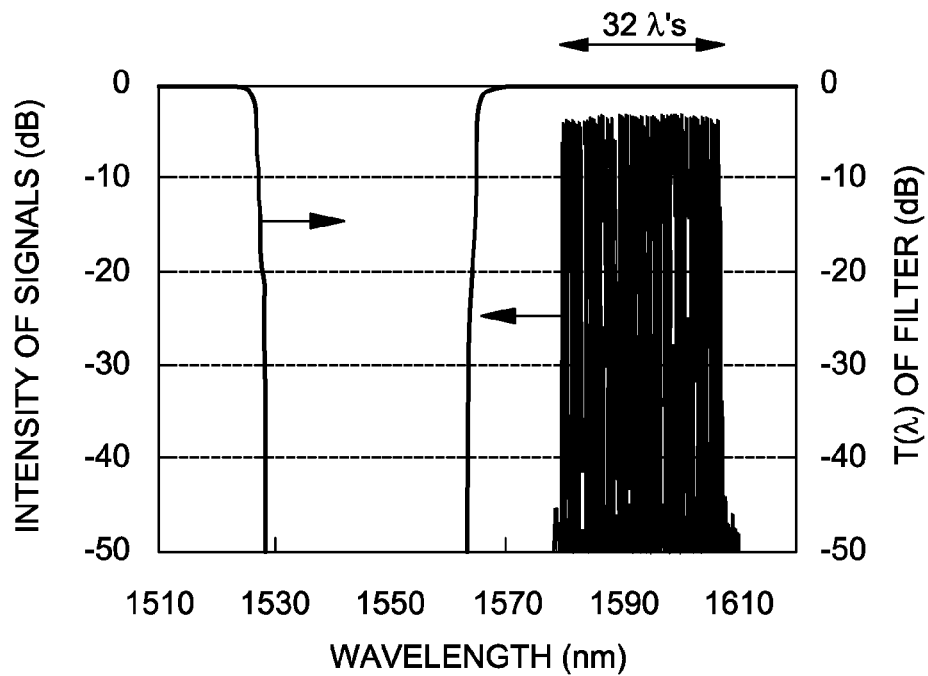

Band filtering characteristics of the interference filters are shown in FIGS. 7(a) and (b). 32 C-band signals are all reflected and 32 L-band signals are all transmitted with this filter.

Operating wavelengths of the 32 C-band T-LDs at OLT and 32 L-band T-LDs at every ONU should be strictly aligned to the ITU-T specified wavelength. Then, wavelengths of the all T-LDs must be monitored and controlled at the central office. Since two pairs of dual-band AWGs are arranged in one chip (FIG. 5), dual-band AWG#1 can be used for wavelength monitoring purpose while the other dual-band AWG#2 is used for signal multi/demultiplexing.

Figure 8:
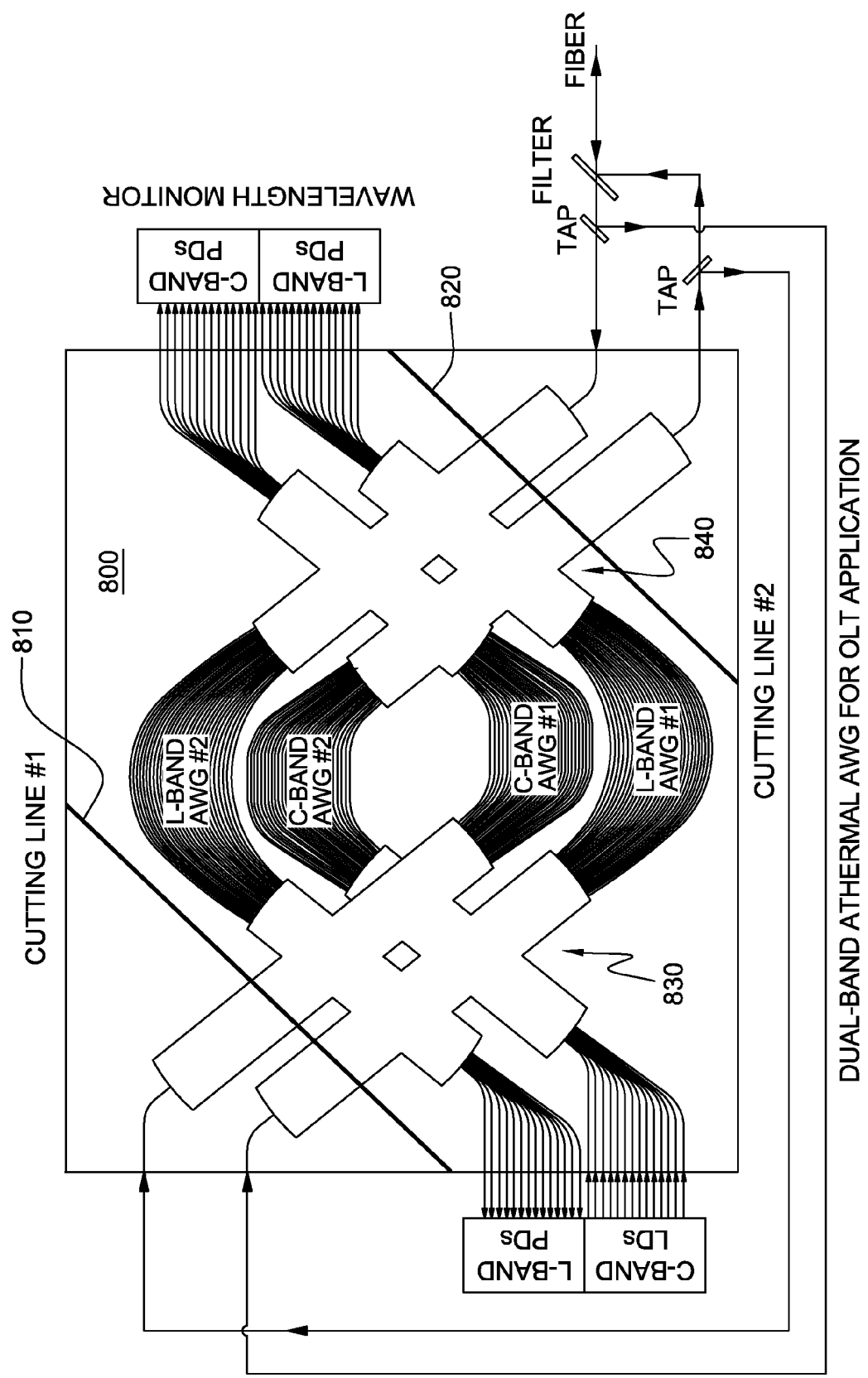
FIG. 8 is a schematic of a dual-band athermal AWG circuit for OLT applications.

FIG. 8 is a schematic of a dual-band athermal AWG circuit 800 of the current invention used in an OLT application. C-band downstream signals from 32 T-LDs are multiplexed by C-band AWG#2, reflected by the interference filter, and coupled into a transmission fiber. A fraction (~10%) of 32 C-band signals is extracted from the main signals by the optical tap and are introduced into the input of C-band AWG#1. Tapped signals are then demultiplexed by AWG#1 and detected by C-band wavelength monitor PDs. The AWGs are interleaved, with the input and output slab regions sharing the same core layer in areas 830, 840; and may also have the elements of the mechanical athermal approach (cutting lines 810, 820 shown through the slab waveguides as an example placement only); and different radii for the input and output slab waveguides, as discussed above.

Figure 9A:
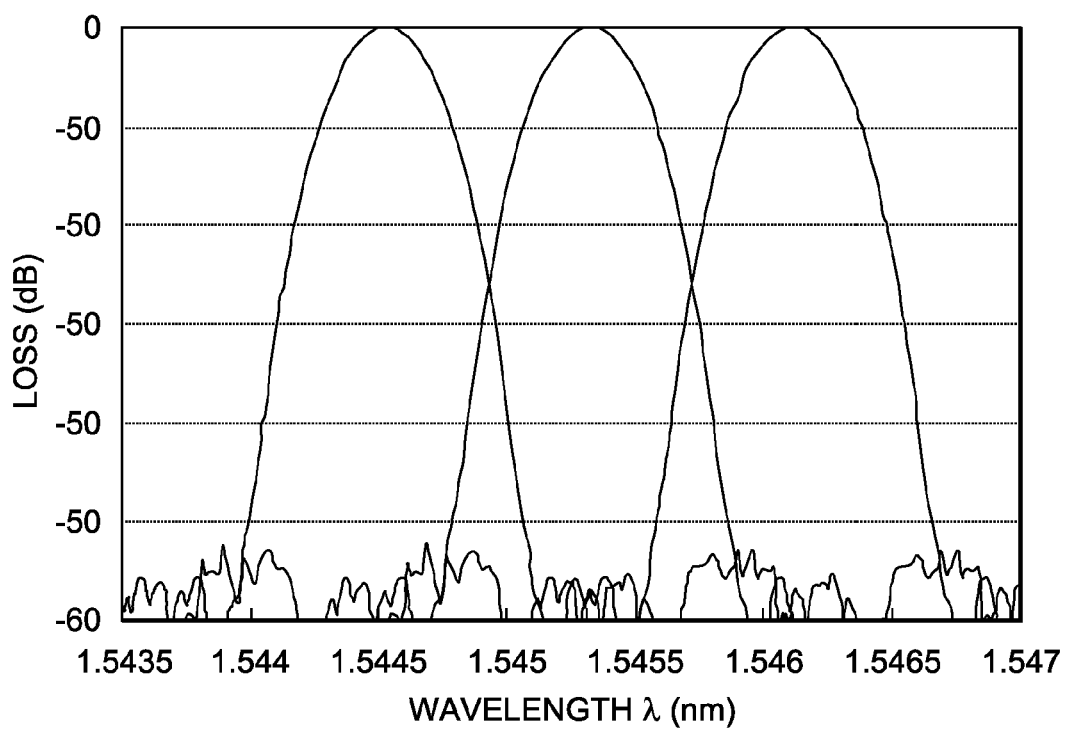
FIG. 9 shows the demultiplexing properties of C- and L-band AWGs.
Figure 9B:
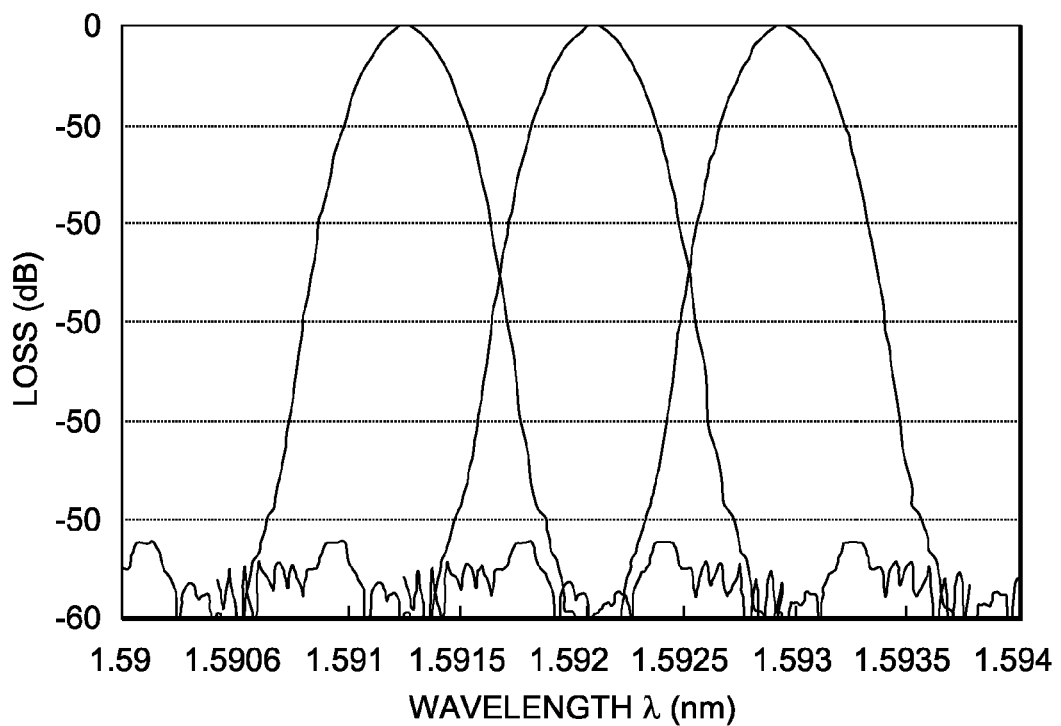

Upstream signals from subscriber ONU's are passed through the interference filter, demultiplexed by the L-band AWG#2, and detected by L-band PDs. A fraction (~10%) of 32 L-band signals is extracted from the main signals by the optical tap and are introduced into the input of L-band AWG#1, demultiplexed by the AWG#1, and detected by the L-band wavelength monitor PDs. FIG. 9 shows demultiplexing properties of C- and L-band AWGs at the center three output ports. When the wavelength of the T-LD deviates from its ITU-T specified wavelength, demultiplexed power from the AWG decreases due to the Gaussian-shaped AWG filter characteristics. Since the optical power of the LD is kept constant by the feedback control of LD itself, power change detected by the wavelength monitor PD normally indicates that the wavelength deviation occurred in the T-LD. Then, all T-LDs in OLT and subscriber ONU's are monitored and corrected to their respective ITU-T wavelengths.

Figure 10:
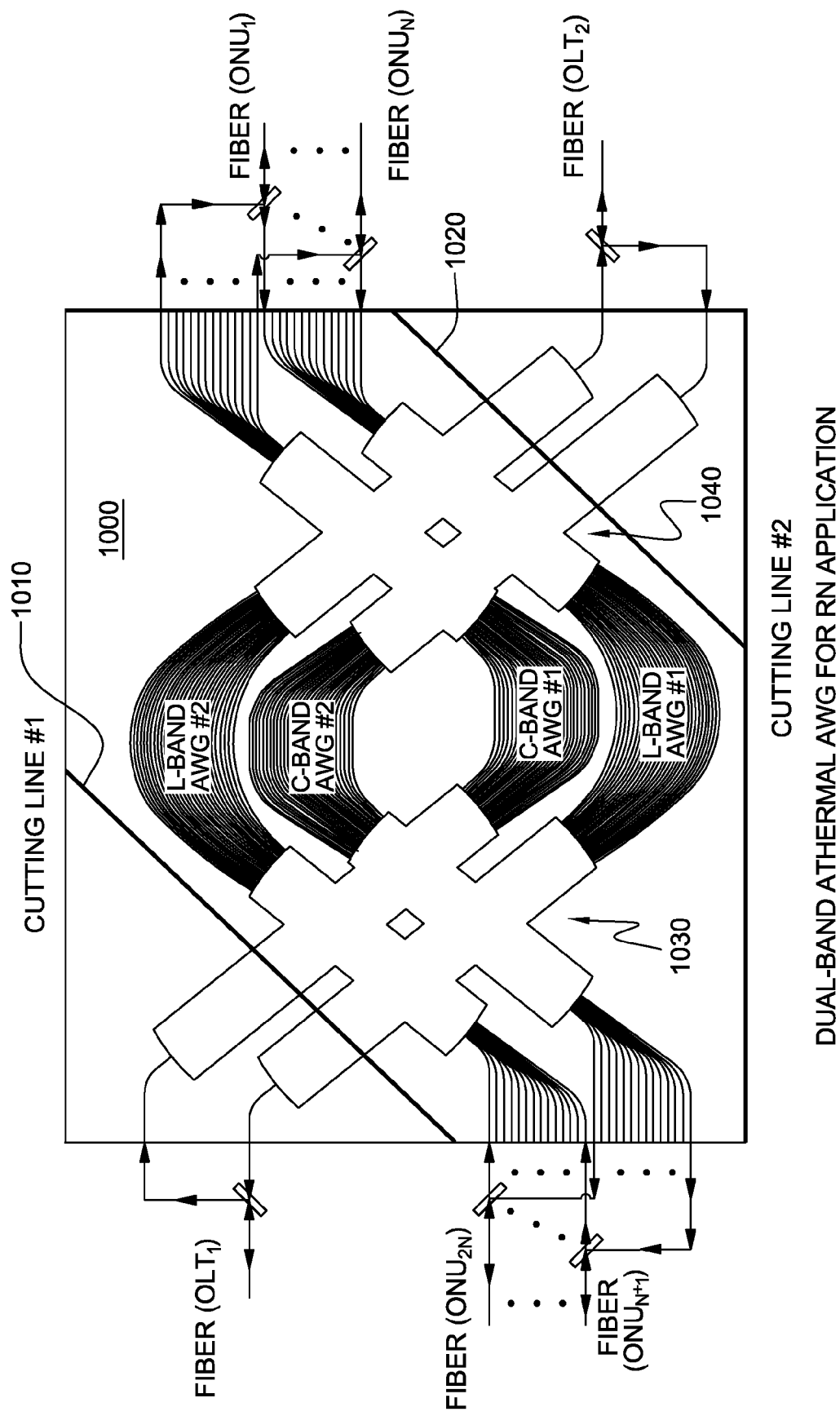
FIG. 10 is a schematic of a dual-band athermal AWG circuit for RN applications.

A dual-band athermal AWG circuit 1000 for an RN application is shown in FIG. 10. For this RN application, two pairs of dual-band athermal AWGs handle two sets of WDM-PON systems independently. In FIG. 10, dual-band AWG#1 connects $OLT_1$ and $ONU_1$~$ONU_N$ (N=32), and dual-band AWG#2 connects $OLT_2$ and $ONU_{N+1}$~$ONU_{2N}$, respectively. The AWGs are interleaved, with the input and output slab regions sharing the same core layer in areas 1030, 1040; and may also have the elements of the mechanical athermal approach (cutting lines 1010, 1020 shown through the slab waveguides as an example placement only); and different radii for the input and output slab waveguides, as discussed above.

All of these variations are considered a part of the claimed invention, and combinations of any of the embodiments above are also considered part of the invention. Fabrication and use of the arrayed waveguide gratings and circuits disclosed herein also form part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An arrayed waveguide grating comprising:
   a plurality of input signal waveguides running toward an input slab waveguide, the input slab waveguide characterized by an input slab waveguide radius between ends thereof;
   a plurality of output signal waveguides running from an output slab waveguide, the output slab waveguide characterized by an output slab waveguide radius between ends thereof;
   a mechanically actuated stabilizing apparatus in the form of a separated chip area implemented with respect to only the input signals or only the output signals; for shifting said signals according to an ambient temperature;
   wherein the input slab waveguide radius is different than the output slab waveguide radius; and
   wherein the mechanically actuated stabilizing apparatus is implemented with respect to the input signal waveguides for shifting the input signal waveguides according to an ambient temperature, and wherein the input slab waveguide radius is larger than the output slab waveguide radius.

2. The arrayed waveguide grating of claim 1, wherein the input slab waveguide radius is at least about 30% greater that the output slab waveguide radius.

3. An arrayed waveguide grating, comprising:
   a plurality of input signal waveguides running toward an input slab waveguide, the input slab waveguide characterized by an input slab waveguide radius between ends thereof;
   a plurality of output signal waveguides running from an output slab waveguide, the output slab waveguide characterized by an output slab waveguide radius between ends thereof;
   a mechanically actuated stabilizing apparatus in the form of a separated chip area implemented with respect to only the input signals; for shifting said signals according to an ambient temperature;
   wherein the input slab waveguide radius is different than the output slab waveguide radius; and
   wherein the mechanically actuated stabilizing apparatus is implemented with respect to the output signal waveguides for shifting the output signal waveguides according to an ambient temperature, and wherein the output slab waveguide radius is larger than the input slab waveguide radius.

4. The arrayed waveguide grating of claim 3, wherein the output slab waveguide radius is at least about 30% greater that the input slab waveguide radius.

5. An arrayed waveguide grating, comprising:
   a plurality of input signal waveguides running toward an input slab waveguide, the input slab waveguide characterized by an input slab waveguide radius between ends thereof;
   a plurality of output signal waveguides running from an output slab waveguide, the output slab waveguide characterized by an output slab waveguide radius between ends thereof;
   a mechanically actuated stabilizing apparatus in the form of a separated chip area implemented with respect to only the input signals or only the output signals; for shifting said signals according to an ambient temperature;
   wherein the input slab waveguide radius is different than the output slab waveguide radius; and
   wherein the input or output slab waveguide which is closer to the separated chip area has a larger radius and therefore a greater tolerance to movement of the separated chip area.

6. The arrayed waveguide grating of claim 5, wherein the mechanically actuated stabilizing apparatus comprises a separated chip area across which the input or output signals traverse toward the respective input or output slab waveguide, the chip area being moveable according to temperature to thereby shift the input or output signal waveguides relative to the input or output slab waveguide.

7. An arrayed waveguide grating circuit comprising a plurality of arrayed waveguide gratings as recited in claim 5.

8. The arrayed waveguide grating circuit of claim 7, wherein the plurality of arrayed waveguide gratings comprises at least two pairs of interleaved arrayed waveguide gratings.

9. A method for stabilizing an arrayed waveguide grating, comprising:
   providing a plurality of input signal waveguides running toward an input slab waveguide, the input slab waveguide characterized by an input slab waveguide radius between ends thereof;
   providing a plurality of output signal waveguides running from an output slab waveguide, the output slab waveguide characterized by an output slab waveguide radius between ends thereof; and
   using a mechanically actuated stabilizing apparatus in the form of a separated chip area implemented with respect to only the input signals or only the output signals; for shifting said signals according to an ambient temperature;
   wherein the input slab waveguide radius is different than the output slab waveguide radius; and
   using the mechanically actuated stabilizing apparatus implemented with respect to the input signal waveguides for shifting the input signal waveguides according to an ambient temperature, and wherein the input slab waveguide radius is larger than the output slab waveguide radius.

10. The method of claim 9, wherein the input slab waveguide radius is at least about 30% greater that the output slab waveguide radius.

11. A method for stabilizing an arrayed waveguide grating, comprising;
   providing a plurality of input signal waveguides running toward an input slab waveguide, the input slab waveguide characterized by an input slab waveguide radius between ends thereof;
   providing a plurality of output signal waveguides running from an output slab waveguide, the output slab waveguide characterized by an output slab waveguide radius between ends thereof; and
   using a mechanically actuated stabilizing apparatus in the form of a separated chip area implemented with respect to only the input signals or only the output signals; for shifting said signals according to an ambient temperature;
   wherein the input slab waveguide radius is different than the output slab waveguide radius; and
   using the mechanically actuated stabilizing apparatus implemented with respect to the output signal waveguides for shifting the output signal waveguides according to an ambient temperature, and wherein the output slab waveguide radius is larger than the input slab waveguide radius.

12. The method of claim 11, wherein the output slab waveguide radius is at least about 30% greater that the input slab waveguide radius.

13. A method for stabilizing an arrayed waveguide grating, comprising:
   providing a plurality of input signal waveguides running toward an input slab waveguide, the input slab waveguide characterized by an input slab waveguide radius between ends thereof;
   providing a plurality of output signal waveguides running from an output slab waveguide, the output slab waveguide characterized by an output slab waveguide radius between ends thereof; and
   using a mechanically actuated stabilizing apparatus in the form of a separated chip area implemented with respect to only the input signals or only the output signals; for shifting said signals according to an ambient temperature;
   wherein the input slab waveguide radius is different than the output slab waveguide radius; and
   wherein the input or output slab waveguide which is closer to the separated chip area has a larger radius and therefore a greater tolerance to movement of the separated chip area.

14. The method of claim 13, wherein the mechanically actuated stabilizing apparatus comprises a separated chip area across which the input or output signals traverse toward the respective input or output slab waveguide, the chip area being moveable according to temperature to thereby shift the input or output signal waveguides relative to the input or output slab waveguide.

15. A method of stabilizing an arrayed waveguide grating circuit comprising stabilizing a plurality of arrayed waveguide gratings as recited in claim 13.

16. The method of claim 15, wherein the plurality of arrayed waveguide gratings comprises at least two pairs of interleaved arrayed waveguide gratings.

* * * * *